(12) United States Patent
Brueck et al.

(10) Patent No.: US 9,341,096 B2
(45) Date of Patent: May 17, 2016

(54) EXHAUST GAS TREATMENT DEVICE FOR USE NEAR AN ENGINE AND MOTOR VEHICLE HAVING THE DEVICE

(71) Applicant: EMITEC GESELLSCHAFT FUER EMISSIONSTECHNOLOGIE MBH, Lohmar (DE)

(72) Inventors: Rolf Brueck, Bergisch Gladbach (DE); Conny Johansson, Goeteborg (SE); Mats Laurell, Goeteborg (SE)

(73) Assignee: Emitec Gesellschaft fuer Emissiontechnologie mbH, Lohmar (DE)

( * ) Notice: Subject to any disclaimer, the term of this patent is extended or adjusted under 35 U.S.C. 154(b) by 0 days.

(21) Appl. No.: 14/095,527

(22) Filed: Dec. 3, 2013

(65) Prior Publication Data

US 2014/0090364 A1 Apr. 3, 2014

Related U.S. Application Data

(63) Continuation of application No. 13/316,759, filed on Dec. 12, 2011, now Pat. No. 8,713,920, which is a continuation of application No. PCT/EP2010/057938, filed on Jun. 7, 2010.

(30) Foreign Application Priority Data

Jun. 12, 2009 (DE) .......................... 10 2009 024718

(51) Int. Cl.
*F01N 3/00* (2006.01)
*F01N 3/02* (2006.01)
(Continued)

(52) U.S. Cl.
CPC *F01N 3/035* (2013.01); *F01N 3/28* (2013.01); *F01N 13/009* (2014.06); *F01N 13/1805* (2013.01); *F01N 13/1888* (2013.01); *F01N 2470/18* (2013.01); *F01N 2490/06* (2013.01); *Y10T 137/8158* (2015.04); *Y10T 137/8593* (2015.04)

(58) Field of Classification Search
CPC ......... F01N 3/035; F01N 3/28; F01N 13/009; F01N 13/1805; F01N 13/1888; F01N 2470/18; F01N 2490/06
USPC ............... 60/280, 297, 299, 311; 55/482, 489
See application file for complete search history.

(56) References Cited

U.S. PATENT DOCUMENTS 6,250,075 B1 6/2001 Funakoshi et al.
7,127,884 B2 * 10/2006 Worner et al. .................. 60/299
(Continued)

FOREIGN PATENT DOCUMENTS

DE 19802624 A1 7/1999
DE 10155086 A1 5/2003
(Continued)

*Primary Examiner* — Audrey K Bradley
(74) *Attorney, Agent, or Firm* — Laurence A. Greenberg; Werner H. Stemer; Ralph E. Locher

(57) ABSTRACT

An exhaust gas treatment device includes at least a housing and a second exhaust gas treatment unit which is disposed at a distance from the housing and extends into the housing. The housing has an opening that is disposed laterally relative to the second exhaust gas treatment unit and extends laterally at least across 50% of the second exhaust gas treatment unit which extends into the housing. A motor vehicle having the exhaust gas treatment device is also provided.

14 Claims, 3 Drawing Sheets

(51) Int. Cl.
  *F01N 3/035* (2006.01)
  *F01N 13/18* (2010.01)
  *F01N 13/00* (2010.01)
  *F01N 3/28* (2006.01)

(56) References Cited

U.S. PATENT DOCUMENTS

| | | | |
|---|---|---|---|
| 7,356,986 B2 | 4/2008 | Aida et al. | |
| 8,015,802 B2 | 9/2011 | Nishiyama et al. | |
| 8,327,629 B2 | 12/2012 | Masuda et al. | |
| 2003/0110763 A1 | 6/2003 | Pawson et al. | |
| 2006/0266022 A1 | 11/2006 | Woerner et al. | |
| 2008/0264048 A1 | 10/2008 | Nishiyama et al. | |
| 2010/0107612 A1 | 5/2010 | Yamazaki et al. | |

FOREIGN PATENT DOCUMENTS

| | | |
|---|---|---|
| DE | 102006055953 A1 | 5/2008 |
| EP | 0931913 A1 | 7/1999 |
| JP | H06170164 A | 6/1994 |
| JP | 2003120277 A | 4/2003 |
| JP | 2004263593 A | 9/2004 |
| JP | 2006291945 A | 10/2006 |
| JP | 2007071035 A | 3/2007 |
| JP | 2007239734 A | 9/2007 |
| JP | 2008255858 A | 10/2008 |
| JP | 2009091982 A | 4/2009 |
| WO | 02077425 A1 | 10/2002 |
| WO | 2006057305 A1 | 6/2006 |
| WO | 2008061610 A1 | 5/2008 |
| WO | 2008136312 A1 | 11/2008 |

\* cited by examiner

US 9,341,096 B2

EXHAUST GAS TREATMENT DEVICE FOR USE NEAR AN ENGINE AND MOTOR VEHICLE HAVING THE DEVICE

CROSS-REFERENCE TO RELATED APPLICATION

This application is a continuation of co-pending U.S. application Ser. No. 13/316,759, which is a continuing application under 35 U.S.C. §120, of copending International Application No. PCT/EP2010/057938, filed on Jun. 7, 2010, which designated the United States; this application also claims the priority, under 35 U.S.C. §119, of German Patent Application DE 10 2009 024 718.1, filed Jun. 12, 2009; the prior applications are herewith incorporated by reference in their entirety.

BACKGROUND OF THE INVENTION

Field of the Invention

The present invention relates to an exhaust-gas treatment device including a housing in which at least one exhaust-gas treatment unit is provided for retaining and/or converting undesired or harmful constituents of an exhaust gas. The exhaust-gas treatment device may therefore have, for example, at least one element from the group including a catalytically active converter, a particle separator, an adsorber and the like, wherein the elements generally form surfaces which are placed in contact with the exhaust gas in the desired way. So-called honeycomb bodies, which have a multiplicity of channels through which exhaust gas can flow, are often used for that purpose. In that case, it is possible for at least a part of the exhaust gas to also pass through the walls of such honeycomb bodies wherein, for example, porous materials, openings, flow diversions and the like may be provided. The invention also relates to a motor vehicle having the exhaust-gas treatment device.

Conventionally, a plurality of exhaust-gas treatment units, which are disposed in series and/or parallel with one another in an exhaust section of an internal combustion engine, are used for the treatment of exhaust gases from mobile internal combustion engines (in particular gasoline, diesel or the like). Since a relatively high temperature is advantageous for many conversion processes for pollutants in the exhaust gas, it is sought to place the exhaust-gas treatment units close to the engine and/or in the engine compartment or bay. However, that is generally highly problematic due to the restricted space available in that region of the motor vehicle. That is also true to a particularly great extent if the motor vehicle or the exhaust system is equipped with an exhaust-gas turbocharger.

Under the above conditions, it was always sought to provide exhaust-gas treatment units having a relatively small volume, in such a way that the total required volume or the required surface area for a complete conversion of the pollutants in the exhaust gas was, if appropriate, split up and relocated into the underbody region of the motor vehicle. Furthermore, concepts are also known in which concentric rings with exhaust-gas treatment units through which a flow can pass in different directions are provided, which are intended to permit a space-saving configuration even in the engine bay.

There is nevertheless a requirement to improve the scope of integration of such exhaust-gas treatment devices, in particular also in the case of relatively large-volume exhaust-gas treatment units. In that case, it is sought in particular to better utilize corner spaces in the region around the engine. Furthermore, the assembly or retrofitting of such systems should be further simplified.

SUMMARY OF THE INVENTION

It is accordingly an object of the invention to provide an exhaust gas treatment device for use near an engine and a motor vehicle having the exhaust gas treatment device, which overcome the hereinafore-mentioned disadvantages and at least partially solve the highlighted problems of the heretofore-known devices and vehicles of this general type. In particular, it is sought to specify an exhaust-gas treatment device which permits a particularly space-saving configuration of exhaust-gas treatment units in the region close to the engine. Furthermore, the device should be simple to assemble, and occasionally also permit maintenance work. The device should permit a space-saving integration of the exhaust-gas treatment devices in the vicinity of the engine, in particular in conjunction with motor vehicles having a turbocharger.

With the foregoing and other objects in view there is provided, in accordance with the invention, an exhaust-gas treatment device, comprising a housing having an opening formed therein, and a second exhaust-gas treatment unit projecting into the housing and spaced apart from the housing. The opening is disposed laterally relative to the second exhaust-gas treatment unit and extends laterally at least over 50% of the second exhaust-gas treatment unit projecting into the housing.

The exhaust-gas treatment unit forms, in particular, an internal flow diversion, wherein the exhaust gas emerging from the second exhaust-gas treatment unit is at least partially (in particular completely) diverted in such a way that it flows into a surrounding region formed between the housing and the second exhaust-gas treatment unit that projects into the housing, and the exhaust gas exits the housing again there through the opening. Consequently, the exhaust gas, as it enters, is introduced into the housing through the second exhaust-gas treatment unit, is diverted, is guided along the outside of at least a part of the second exhaust-gas treatment unit, and is then extracted from the housing again through the opening. In this case, it is preferable for the second exhaust-gas treatment unit to project over the predominant part of its length into the housing, and for at least 50% of the opening to be disposed laterally with respect to the second exhaust-gas treatment unit, that is to say opposite the circumferential surface of the second exhaust-gas treatment unit. Accordingly, the opening is also formed so as to be relatively large, in particular with a diameter of at least 50 mm [millimeters] or even 80 mm. This also makes it possible, in particular, for a further exhaust-gas treatment unit to be positioned directly in or on the opening. In other words this, however, also means that the diameter of the opening which is positioned laterally adjacent the second exhaust-gas treatment unit overlaps most of that part of the length of the second exhaust-gas treatment unit (in the longitudinal direction of the second exhaust-gas treatment unit) which projects into the housing.

Merely for the sake of completeness, it is pointed out that the designation of parts of the invention as "first," "second" and "third," such as is used herein, serves merely for making a distinction. It is, however, generally not intended to signify any ranking, sequence or the like.

In accordance with another advantageous embodiment of the invention, the exhaust-gas treatment device has at least one first housing portion with an opening and at least one second housing portion which projects from the first housing portion. The second housing portion is disposed obliquely with respect to the first housing portion on the opening thereof, forms a connection at the opening and includes a first exhaust-gas treatment unit.

The first housing portion is, for example, a collecting chamber for the exhaust gases, which is widened or enlarged in relation to the cross section of the rest of the exhaust line. The first housing portion is generally produced from metal, in particular from a high-temperature-resistant and corrosion-resistant material. The second housing portion preferably includes substantially the same material as the first housing portion. The first housing portion and the second housing portion form a complete housing when they are joined or connected to one another. The housing, in particular, connects two exhaust lines to one another. In this case, the housing is preferably constructed in such a way as to realize a direction reversal or diversion of the exhaust-gas flow. This is effected by virtue of the second housing portion being disposed obliquely on the opening of the first housing portion. In other words, this means also that the opening is, for example, not disposed in alignment with or opposite the inflow region for the exhaust gas. Assuming that the exhaust lines leading to and away from the two housing portions define a flow direction, the two flow directions define an angle with respect to one another, in such a way that a flow diversion is formed. In this case, it is preferable for the exhaust gas to be diverted in the region of the first housing portion and to then flow (entirely) into the second housing portion through the opening. In this respect, the first housing portion (independently) forms a (free) volume in which all of the exhaust gas is diverted. In this way, for example, at least half of the volume enclosed by the first housing portion is free from fixtures.

The opening toward the second housing portion is preferably so large that the first exhaust-gas treatment unit disposed in the second housing portion can be impinged on uniformly by the flow directly through the opening. If the first exhaust-gas treatment unit is formed, for example, with a honeycomb body, it is accordingly preferable for all of the channels to be equally visible or subjectable to the flow through the opening. In this case, the configuration of the first exhaust-gas treatment unit is preferably such that the end side of the first exhaust-gas treatment unit is positioned substantially parallel to the opening, in particular in the direct vicinity of or even in the same plane as the opening. In this case, in order to likewise obtain a compact configuration, the connection is provided (only) at the outside on the housing portions.

In accordance with a further very particularly preferable feature of the invention, the connection is formed with a flange and the first exhaust-gas treatment unit extends as far as the flange. A "flange" is regarded, in particular, as being an encircling, outwardly directed collar which is formed around the opening and very particularly preferably around both housing portions.

The connection may be constructed to be detachable, but it is preferable for a welded connection to be formed in the region of the flange. In any case, the connection is constructed to be permanently gas-tight under normal exhaust-gas treatment conditions.

In this case, too, it is preferable for the exhaust-gas treatment unit to extend as far as the flange, that is to say in particular to be disposed in such a way that no (large) portion of the second housing portion, through which the flow can pass freely, is provided between the flange and the inlet of the exhaust gases into the exhaust-gas treatment unit. If appropriate, it is also possible for the first exhaust-gas treatment unit to project beyond the flange or the collar of the first housing portion and then, in the assembled state, to extend into the first housing portion.

In accordance with an added embodiment of the exhaust-gas treatment device of the invention, only either the first housing portion or the second housing portion forms at least one flow diversion. In other words, this means in particular that one housing portion is constructed substantially only for accommodating an exhaust-gas treatment unit and the other housing portion is constructed predominantly only for realizing a flow diversion. The housing portion with the flow diversion preferably forms at least a flow diversion through approximately 80° or approximately 110° or even approximately 180°. If appropriate, it is also possible for a plurality of flow diversions to be realized in series and/or for partial exhaust-gas flows.

In accordance with an additional advantageous feature of the invention, the second housing portion is formed with a casing of the first exhaust-gas treatment unit. This means, in particular, the casing or casing tube which exhaust-gas treatment units themselves conventionally have and to which they are directly or indirectly connected. If the exhaust-gas treatment unit is constructed, for example, by using metal components (sheet metal, nonwoven, mesh, . . . ), these may be brazed to the casing tube. If the exhaust-gas treatment unit has a (partially or entirely) ceramic assembly, it may be pressed into the casing. In this case, the casing substantially constitutes the outer contour of the exhaust-gas treatment unit, which also means in other words that the exhaust-gas treatment unit (almost) completely fills out the second housing portion or the casing. In this case, it is possible, in particular, for the materials of the casing and of the first housing portion to differ. In this case, it should be ensured, if appropriate, that in the region of the connection, material thicknesses should be provided which are adequate to realize a stable connection of the first housing portion and the second housing portion.

In accordance with yet another advantageous feature of the invention, at least one flow channel is provided in the exhaust-gas treatment device, which flow channel projects into the first housing portion and is spaced apart from the first housing portion. It is thereby possible for the housing portion and the flow channel to realize, for example, a central tubular flow and an outer annular flow, wherein a flow diversion is then conventionally also formed through the use of the first housing portion. The spaced-apart flow channel may be formed, for example, in the manner of an elongation of an exhaust line which projects into the first housing portion. It is also preferable for the spaced-apart flow channel to extend inwards over half of the extent of the housing portion and, if appropriate, to in particular also pass the opening toward the second housing portion.

In accordance with yet a further advantageous feature of the invention, specifically in this connection, the at least one flow channel is a supporting element for at least one further exhaust-gas treatment unit. In other words, this also means that the flow channel is constructed and/or configured so as to be so stable that it itself can receive and hold an exhaust-gas treatment unit. Accordingly, the flow channel is constructed, for example, as a self-supporting tube, in the interior of which or on the outer periphery or circumference of which an exhaust-gas treatment unit may be provided.

In accordance with yet an added very particularly preferable feature of the invention, the first exhaust-gas treatment unit is a particle separator. This is the case, in particular, if the exhaust-gas treatment unit interacts with a diesel engine. If appropriate, the first exhaust-gas treatment unit may, in particular if a lean-burn engine or spark-ignition engine produces the exhaust gas, be formed with a nitrogen oxide adsorber (NOx adsorber). The particle separator may have a ceramic and/or metallic nature. In this case, so-called wallflow filters are suitable, as are so-called "open particle separators" in which internal bypasses are provided in such a way that the exhaust gas can flow past the filter medium.

In accordance with yet an additional feature of the invention, the first housing portion is formed with a sensor. In this case, the sensor is preferably disposed where a free cross section or a region without internals is formed by the first housing portion. This is the case, for example, in the region of the flow diversion. If information regarding a specifiable fraction of the exhaust gas and/or of the exhaust-gas treatment unit suffice, the at least one sensor may also extend into the exhaust-gas treatment unit (in an integrated configuration).

In accordance with again another particularly preferred and compact feature of the exhaust-gas treatment device of the invention, a plurality of exhaust-gas treatment units are provided which are configured with an overlap. This means, in other words, for example, that at least two exhaust-gas treatment units are configured with a different alignment (orientation or position) in an overlapping manner. An "overlap" is realized, for example, in the case of a skewed configuration or a configuration with intersecting central axes. In this case, the flow diversion very particularly preferably takes place in a housing portion in such a way that the exhaust gas flows out of an exhaust-gas treatment unit in a first flow direction, is then diverted and if appropriate conducted partially past the outside of the exhaust-gas treatment unit, and enters the following exhaust-gas treatment unit again in a flow direction which differs from the first flow direction.

With the objects of the invention in view, there is concomitantly provided a motor vehicle, comprising an internal combustion engine (in particular one which is operated with an excess of air) and an exhaust system having at least one turbocharger. The motor vehicle also has an exhaust-gas treatment device according to the invention described herein, wherein the at least one exhaust-gas treatment device is positioned directly downstream of the turbocharger. This is intended to express, in particular, that the exhaust-gas treatment device is positioned directly downstream of the turbocharger in terms of flow, that is to say the exhaust gas flows from the turbocharger directly into the exhaust-gas treatment device.

Other features which are considered as characteristic for the invention are set forth in the appended claims, noting that the features specified individually in the claims may be combined with one another in any desired technologically expedient manner and form further embodiments of the invention.

Although the invention is illustrated and described herein as embodied in an exhaust gas treatment device for use near an engine and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
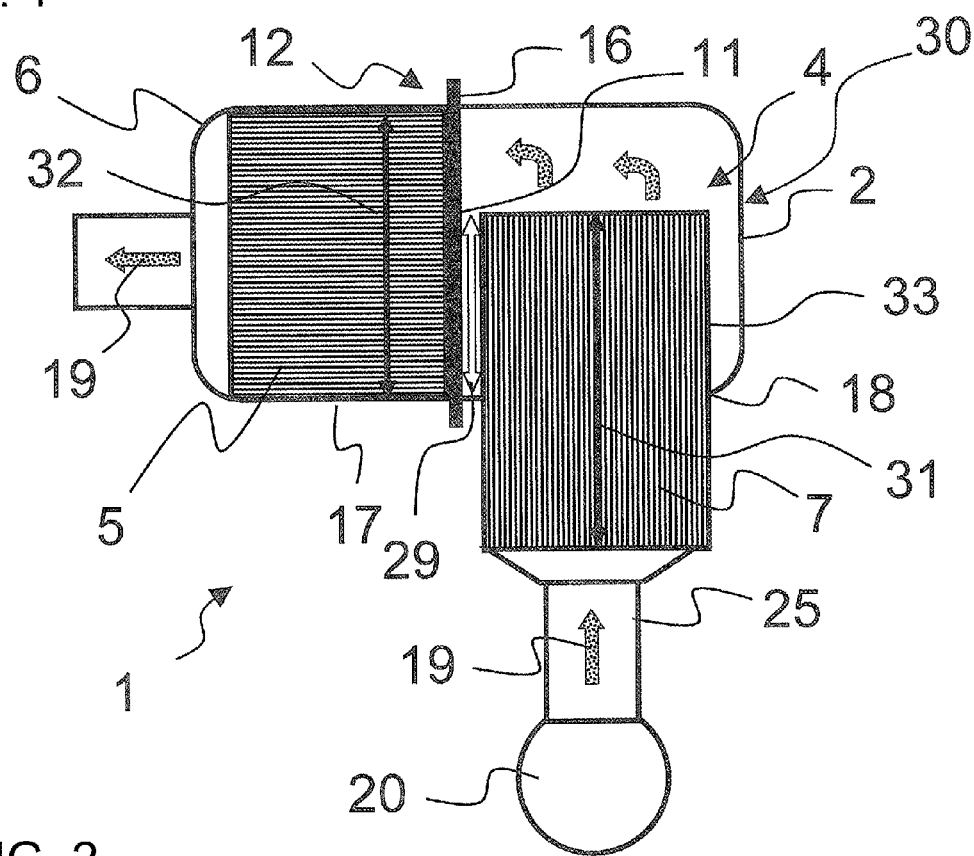
FIG. 1 is a diagrammatic, longitudinal-sectional view of a first structural variant of an exhaust-gas treatment device according to the invention.

Referring now in detail to the figures of the drawing for explaining the invention and the technical field in more detail by showing particularly preferred structural variants to which the invention is not restricted and in which the same reference numerals denote the same parts, and first, particularly, to FIG. 1 thereof, there is seen a cross section of a first structural variant of an exhaust-gas treatment device 1. In this respect, the figure shows an exhaust-gas treatment device 1 having a housing 30 with a second exhaust-gas treatment unit 7, which projects into and is spaced apart from the housing 30. The housing 30 has an opening 11 which is disposed laterally with respect to the second exhaust-gas treatment unit 7. In this case, the (single) opening 11 is dimensioned and positioned so as to provide a significant overlap 29, that is to say in such a way that a significant part of a diameter 32 of the opening 11 is situated opposite a circumferential surface 33 of the second exhaust-gas treatment unit 7. It is preferable for such a large part of a length 31 of the second exhaust-gas treatment unit 7 to be formed so as to project into the housing 30 (at a spacing from the housing 30, in particular in such a way that an annular space is formed) that the opening 11 (and if appropriate a further exhaust-gas treatment unit) is disposed more than 50% in the region of the second exhaust-gas treatment unit 7.

A turbocharger 20 is diagrammatically illustrated at the bottom right of FIG. 1. The exhaust gas flows from the turbocharger 20 in a flow direction 19 through an exhaust line 25 and directly rectilinearly into the second exhaust-gas treatment unit 7. The second exhaust-gas treatment unit 7 may be a catalytic converter (in particular a so-called oxidation catalytic converter), a nitrogen oxide adsorber or a combination of both, in particular in an application in conjunction with a diesel engine. In the case of such an exhaust-gas treatment unit being used with a spark-ignition engine, the second exhaust-gas treatment unit 7 could also be formed as a three-way catalytic converter.

The exhaust gas flows onward from the second exhaust-gas treatment unit 7 into a first housing portion 2, which forms a flow diversion 4. For this purpose, the second exhaust-gas treatment unit 7 extends at least partially into the first housing portion 2 and is connected to the latter through the use of a weld seam 18. The first housing portion 2 furthermore forms the opening 11 through which the exhaust gas exits the first housing portion 2 again. In this case, the opening 11 is positioned in such a way that an approximately 90° diversion of the exhaust gas is realized by the first housing portion 2 in the region of the flow diversion 4. In this case, the opening 11 is formed at the outside with a flange 16 which ultimately forms a connection 12 to a second housing portion 6. In this case, the structure of the opening 11 and/or of the configuration of the second housing portion 6 and/or of a first exhaust-gas treatment unit 5 is such that the first exhaust-gas treatment unit 5 laterally overlaps the second exhaust-gas treatment unit 7. In this case, the overlap amounts to preferably at least 50% (in relation to the opening 11 or the end side of the first treatment unit 5), particularly preferably at least 80%. A particularly space-saving configuration of the two exhaust-gas treatment units can be attained in this way.

The direct connection of the first housing portion 2 and the second housing portion 6 through the flange 16 may additionally be formed with a weld seam. Furthermore, the second housing portion 6 may also directly form a casing 17 of the first exhaust-gas treatment unit 5. The first exhaust-gas treatment unit 5 may, for example, be a filter (in particular in the case of a diesel engine) and/or a nitrogen oxide adsorber (in particular when used with a lean-burn spark-ignition engine). Under some circumstances, it is also possible, specifically if a second exhaust-gas treatment unit 7 is provided, for the first exhaust-gas treatment unit 5 to be situated further remote, or to be disposed further downstream in the flow direction 19. It is precisely this overlapping configuration of the opening 11 and the second exhaust-gas treatment unit 7 which leads to a particularly space-saving construction of the exhaust-gas treatment device 1 and therefore also to a space-saving integration of such an exhaust-gas treatment device 1 in the engine compartment of a motor vehicle.

Figure 2:
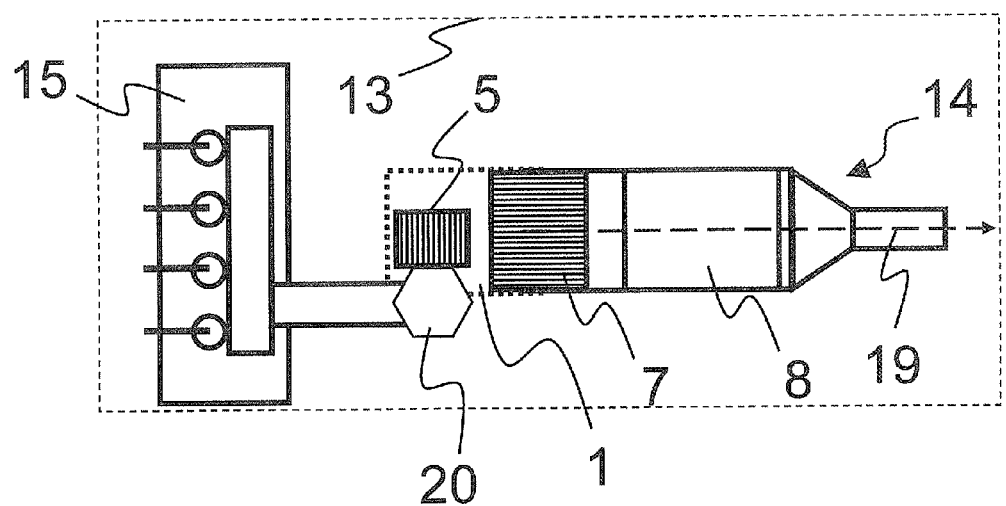
FIG. 2 is a plan view of a motor vehicle having a first structural variant of an exhaust system.

FIG. 2 shows a configuration of a diagrammatically illustrated motor vehicle 13. The motor vehicle 13 has an internal combustion engine 15 and the exhaust gas produced therein is conducted through an exhaust system 14 in a flow direction 19. In the disclosure explained herein, the exhaust gas 19 flows firstly through an exhaust-gas turbocharger 20 and then flows directly through a first exhaust-gas treatment unit 5, is then diverted in the exhaust-gas treatment device 1 (in particular with the overlap of the exhaust-gas treatment units already discussed above) and then flows into a second exhaust-gas treatment unit 7. Further exhaust-gas treatment units may be provided downstream of the second exhaust-gas treatment unit 7 and at least one third exhaust-gas treatment unit 8 is illustrated therein.

Figure 3:
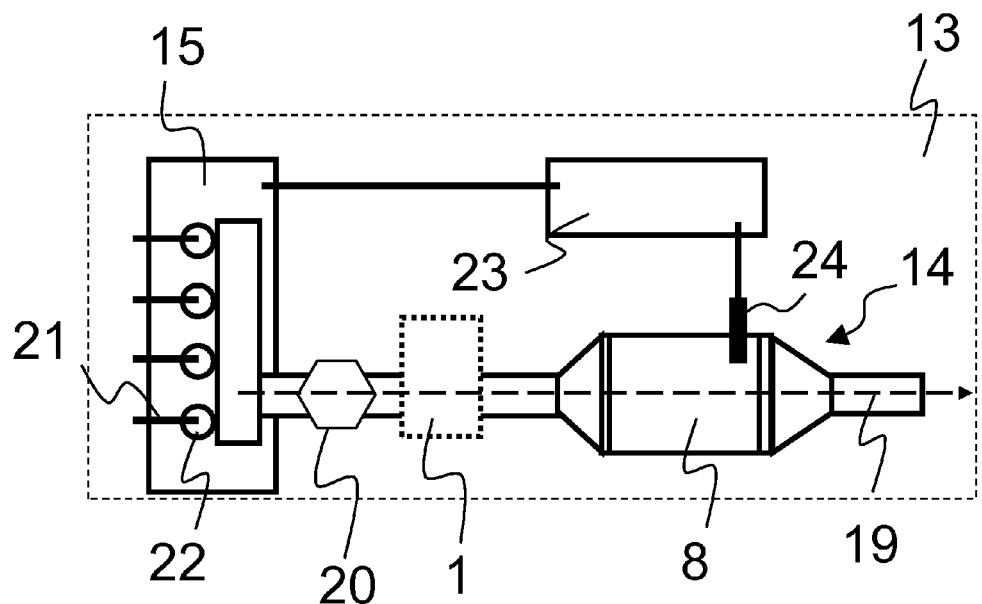
FIG. 3 is a plan view of a motor vehicle having a second structural variant of an exhaust system.

FIG. 3 shows a further possible configuration of a motor vehicle 13 having an internal combustion engine 15. A fuel supply 21 and a combustion chamber 22, in which combustion takes place, are also diagrammatically illustrated in the figure, for one embodiment. The exhaust gas is again firstly supplied to a turbocharger 20 and subsequently flows through the exhaust-gas treatment device 1 according to the invention. Due to its compact nature, the exhaust-gas treatment device 1 can be disposed very close to an internal combustion engine 22, that is to say in the direct vicinity of the engine. The exhaust gas then exits the exhaust-gas treatment device 1 and flows, for example, in the underbody region, where a third exhaust-gas treatment unit 8 is provided. In this sequence, the exhaust gas consequently flows through in a predefined flow direction 19 of further structural variants of an exhaust system 14. In this case, it is also indicated that a sensor 24 may be provided which interacts with a controller 23 (for example an engine controller) in order to monitor or regulate the combustion processes.

Figure 4:
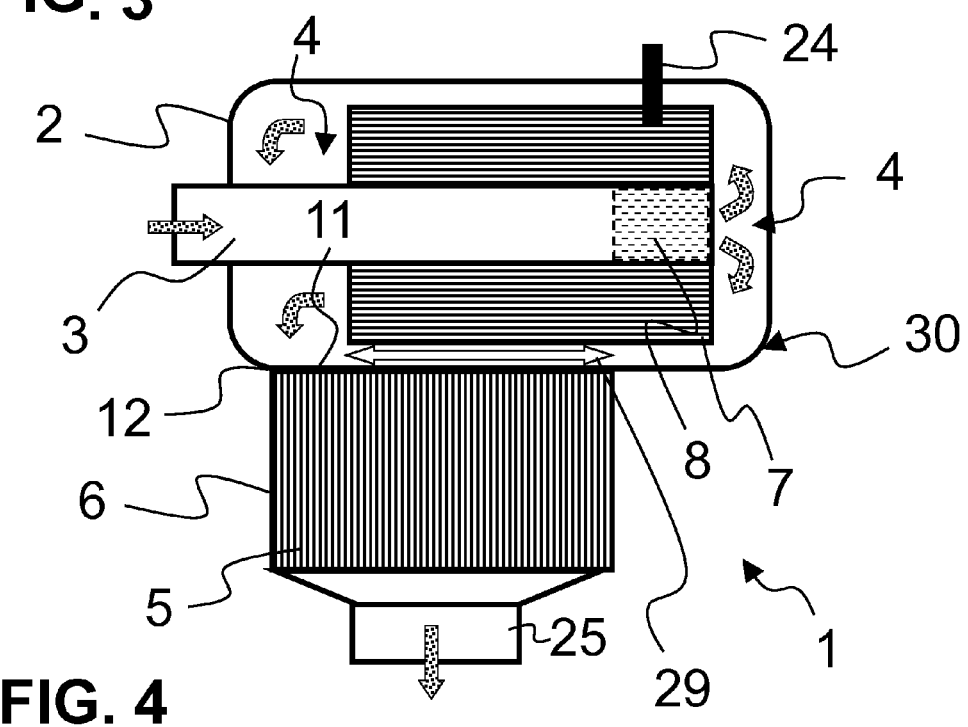
FIG. 4 is a longitudinal-sectional view of a further structural variant of the exhaust-gas treatment device.

FIG. 4 shows a variant in which the exhaust gas flows into the exhaust-gas treatment device 1 through a separate flow channel 3 which is formed so as to be spaced apart from the first housing portion 2 but which likewise extends substantially over a large part of the extent of the first housing portion 2. In this case, the flow channel 3 is constructed as a supporting tube, in the interior space of which there may even be provided a third exhaust-gas treatment unit 8. After the flow passes through the flow channel 3, a flow diversion 4 takes place in an end region of the first housing portion, in such a way that the exhaust gas then flows again into a catalytic converter, that is an outer second exhaust-gas treatment unit 7, which is formed annularly around the flow channel 3. After exiting the second exhaust-gas treatment unit 7, the exhaust gas again flows out laterally through the opening 11 of the first housing portion 2, specifically through a joined connection 12 at the opening 11, at which a second housing portion 6 with a first exhaust-gas treatment unit 5 is provided. The exhaust gas also flows through the first exhaust-gas treatment unit 5 and exits the exhaust-gas treatment device 1 through the exhaust line 25 as shown.

Figures 5, 6:
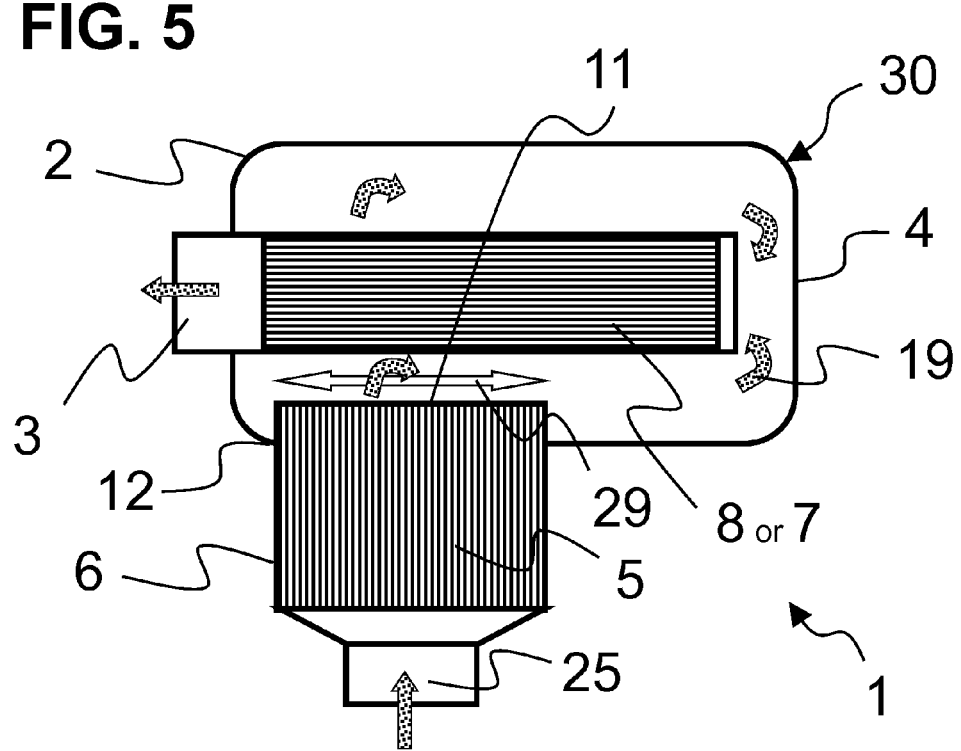
FIG. 5 is a longitudinal-sectional view of yet a further structural variant of the exhaust-gas treatment device.
FIG. 6 is an end-elevational view of an exhaust-gas treatment unit.

FIG. 5 illustrates, in a reversed flow direction, how the exhaust gas firstly flows in through the exhaust line 25 and flows through the first exhaust-gas treatment unit 5. The first exhaust-gas treatment unit is disposed in a second housing portion 6 (which is formed in this case, in particular, in the manner of a casing tube) that protrudes into the opening 11 of the first housing portion 2 and, there, is connected to the first housing portion 2 through a cohesive connection 12. The first housing portion 2 then forms a double flow diversion 4, in such a way that an inlet for the exhaust gas into the separate, spaced-apart flow channel 3 is ultimately realized. A further exhaust-gas treatment unit 8 is disposed in the flow channel 3, wherein again, a particularly compact construction can be attained as a result of the overlapping configuration of the two exhaust-gas treatment units. As is indicated by corresponding arrows, the exhaust gas then exits the exhaust-gas treatment device 1 in the flow direction 19.

FIG. 6 serves to illustrate the construction of a possible structural variant for an exhaust-gas treatment unit 5. Firstly illustrated in the figure is a casing 17, in this case having a cylindrical shape or form, which distinguishes the outer contour of the first exhaust-gas treatment unit 5. A plurality of layers, which form channels 28, are provided in the interior of the casing 17. In the case of a catalytic converter it is, for example, possible for structured layers 26 and smooth layers 27 to be provided in an alternating fashion. These layers fill out the cross section in the interior of the casing 17 and thereby form a multiplicity of such channels 28. Some of the layers may also be formed with channel constriction elements, flow diverting elements, porous materials, openings and the like. It is thus possible to realize not only catalyst carrier bodies but also filters, adsorbers and the like. Whereas FIG. 6 substantially illustrates a metallic structure of such an exhaust-gas treatment unit, extruded ceramic carrier elements may also be used.

The system according to the invention is accordingly preferably constructed as follows:

- The exhaust gas flows out of the turbine directly and rectilinearly into an exhaust-gas treatment unit.
- The exhaust-gas treatment unit may be an oxidation catalytic converter, a NOx adsorber or a combination of the two in the case of a diesel engine application. In the case of a spark-ignition engine application, the exhaust-gas treatment unit is preferably a so-called 3-way catalytic converter.
- The exhaust gas flows out of the exhaust-gas treatment unit into an outflow/diversion chamber. The diversion chamber has an outlet flange at approximately 90° with respect to the original flow direction. The outlet flange is situated at least partially in the region (below) the above exhaust-gas treatment unit (creating an overlap).
- A further exhaust-gas treatment unit is directly flange-mounted on the flange. The further exhaust-gas treatment unit may either be a filter (for example in the case of a diesel engine) and/or a NOx adsorber (for example in the case of a lean-burn spark-ignition engine).
- If the further exhaust-gas treatment unit is not to be provided, an outlet cone (having a tapering cross section) is mounted on the diverting chamber in order to form the transition to the exhaust pipe.

The invention claimed is:

1. An exhaust-gas treatment device, comprising:
a housing including a first housing portion having an opening formed therein and at least one second housing portion projecting from said first housing portion, disposed obliquely relative to said first housing portion at said opening and forming a connection between said first and second housing portions at said opening, said opening interconnecting and conducting exhaust gas between said first and second housing portions;
a first exhaust-gas treatment unit disposed in said at least one second housing portion and having an end side positioned in the direct vicinity of said opening and substantially parallel to said opening;
at least one further exhaust-gas treatment unit being spaced apart from said first housing portion and positioned within said housing;
said first and said at least one further exhaust-gas treatment units conducting exhaust gas in two different flow directions defining an angle other than 180° with respect to one another;
a self-supporting tube for said at least one further exhaust-gas treatment unit, said self-supporting tube projecting into said first housing portion and having an interior and an outer periphery or circumference;
said at least one further exhaust-gas treatment unit being disposed at least one of in said interior or on said outer periphery or circumference of said self-supporting tube;
said opening disposed laterally relative to said at least one further exhaust-gas treatment unit and extending laterally at least over 50% of said at least one further exhaust-gas treatment unit; and
a first exhaust gas line leading to said housing portions containing said first and said at least one further exhaust-gas treatment units and a second exhaust gas line leading away from said housing portions, said exhaust gas lines each defining a respective flow direction disposed at an angle other than 180° with respect to each other.

2. The exhaust-gas treatment device according to claim 1, wherein said at least one second housing portion is formed with a casing for said first exhaust-gas treatment unit.

3. The exhaust-gas treatment device according to claim 1, wherein said first housing portion is formed with a sensor.

4. The exhaust-gas treatment device according to claim 1, wherein said exhaust-gas treatment units are disposed with an overlap.

5. The exhaust-gas treatment device according to claim 1, wherein said exhaust-gas treatment units have respective channels disposed at an angle other than 180° with respect to each other.

6. The exhaust-gas treatment device according to claim 1, wherein said opening is an entrance opening to said first exhaust-gas treatment unit and is disposed transverse to a direction of extension of said at least one further exhaust-gas treatment unit.

7. The exhaust-gas treatment device according to claim 1, wherein said exhaust gas lines have circumferential walls and ends, and said exhaust gas lines direct the exhaust gas to pass only through said ends.

8. The exhaust-gas treatment device according to claim 1, wherein said flow directions defined by said exhaust gas lines are non-parallel to each other.

9. The exhaust-gas treatment device according to claim 1, wherein said flow directions defined by said exhaust gas lines are disposed at an angle of 90° to each other.

10. The exhaust-gas treatment device according to claim 1, wherein said housing has an L-shape and said first and second housing portions form legs of said L-shape.

11. The exhaust-gas treatment device according to claim 1, wherein said first and said at least one further exhaust-gas treatment units together form an L-shape.

12. The exhaust-gas treatment device according to claim 1, which further comprises at least one flow diversion formed by said first housing portion.

13. The exhaust-gas treatment device according to claim 12, wherein said first exhaust-gas treatment unit is a particle separator.

14. A motor vehicle, comprising:
an internal combustion engine;
an exhaust system associated with said internal combustion engine and having at least one turbocharger; and
an exhaust-gas treatment device according to claim 1 positioned directly downstream of said turbocharger in an exhaust-gas flow direction.

* * * * *